United States Patent
Acharya et al.

(10) Patent No.: US 11,019,830 B2
(45) Date of Patent: Jun. 1, 2021

(54) COMPOSITION CONTAINING VEGETABLE OIL, CARAMEL AND PHENOLIC COMPOUNDS

(71) Applicant: Conopco, Inc., Englewood Cliffs, NJ (US)

(72) Inventors: Parag Acharya, Oegstgeest (NL); Jadwiga Malgorzata Bialek, Bedford (GB); Johannes Hendrikus Maria van den Broek, 's Gravenzande (NL); Franciscus Johannes H M Jansen, Leiden (NL)

(73) Assignee: Conopco Inc., Englewood Cliffs, NJ (US)

( * ) Notice: Subject to any disclaimer, the term of this patent is extended or adjusted under 35 U.S.C. 154(b) by 479 days.

(21) Appl. No.: 15/737,781

(22) PCT Filed: Jun. 7, 2016

(86) PCT No.: PCT/EP2016/062861
§ 371 (c)(1),
(2) Date: Dec. 19, 2017

(87) PCT Pub. No.: WO2017/001154
PCT Pub. Date: Jan. 5, 2017

(65) Prior Publication Data
US 2019/0000104 A1    Jan. 3, 2019

(30) Foreign Application Priority Data
Jun. 30, 2015  (EP) .................................. 15174544

(51) Int. Cl.
| | |
|---|---|
| A23G 3/32 | (2006.01) |
| C11B 5/00 | (2006.01) |
| A23D 7/06 | (2006.01) |
| A23L 27/60 | (2016.01) |
| A23D 7/005 | (2006.01) |
| A23D 7/01 | (2006.01) |
| A23D 7/02 | (2006.01) |
| A23L 27/00 | (2016.01) |
| A23L 33/105 | (2016.01) |
| A23L 33/115 | (2016.01) |

(52) U.S. Cl.
CPC ............ *A23D 7/06* (2013.01); *A23D 7/0053* (2013.01); *A23D 7/011* (2013.01); *A23D 7/02* (2013.01); *A23G 3/32* (2013.01); *A23L 27/00* (2016.08); *A23L 27/60* (2016.08); *A23L 33/105* (2016.08); *A23L 33/115* (2016.08); *C11B 5/0021* (2013.01); *C11B 5/0035* (2013.01); *C11B 5/0092* (2013.01); *A23V 2002/00* (2013.01)

(58) Field of Classification Search
CPC .................. A23G 3/32; C11B 5/0092
See application file for complete search history.

(56) References Cited

U.S. PATENT DOCUMENTS

| | | | |
|---|---|---|---|
| 9,949,501 B2 | 4/2018 | Acharya et al. | |
| 2010/0028518 A1 | 2/2010 | West et al. | |
| 2010/0159089 A1 | 6/2010 | Lis et al. | |
| 2012/0178806 A1* | 7/2012 | Boch .................. | A61K 9/107 |
| | | | 514/529 |

FOREIGN PATENT DOCUMENTS

| | | |
|---|---|---|
| CN | 101708062 | 5/2010 |
| DE | 202012004206 | 8/2012 |
| EP | 1446020 | 2/2008 |
| JP | 10150949 | 6/1998 |
| JP | 2009219460 | 10/2009 |
| WO | WO9634535 | 11/1996 |
| WO | WO02069737 | 3/2003 |
| WO | 03037098 A1 | 5/2003 |
| WO | WO2013189709 | 12/2013 |
| WO | WO2014033761 | 3/2014 |

OTHER PUBLICATIONS

Mayonnaise and salad dressing products, Chapter 10, A Complete Course in Canning, p. 443 and 451, published 1996. (Year: 1996).*
GNPD—Chocolate Ice Cream, GNPD—Chocolate Ice Cream, Sep. 2014, pp. 1-2 (XP055295090,Retrieved from the Internet: URL:http://www.gnpd.com/sinatra/recordpage/2680111/),.
C. Severini et al., Effects of Non-Enzymatic Browning Reactions on Lipid Oxidation in Emulsified Model Systems, Italian Journal of Food Science, 1998, pp. 147-153, vol. 10, No. 2.
IPRP2 in PCTEP2016062861, Sep. 26, 2017.
M.L. Chen et al., Effects of Temperature and Sugar Concentration on the Colour Development, 5-hydroxymethoxylfurfural Production, and Antioxidative Activity Development in the Caramelisation of Acidic Glucose Solution, International Journal of Food Engineering, Jan. 1, 2012, Art. 15, pp. 1-17, 8(2).
Maarten Alderliesten, Mean Particle Diameters Part II: Standardization of Nomenclature, Particel and Particel Systems Characterization, 1991, pp. 237-241, vol. 8, .,.
P.J. Tsai et al., Effect of pH sugar and phenolic compounds on the color and antioxidant capacity of caramel, ACS 243th National Meeting, Aug. 19, 2007, p. 1, AGFD 191.
Praphan Pinsirodom et al., Quality of commercial wine vinegars evaluated on the basis of total polyphenol content and antioxidant properties, Asian Journal of Food and Agro-Industry, Jan. 1, 2010, 389-397, 3(04), TH.

(Continued)

*Primary Examiner* — Walter A Moore
(74) *Attorney, Agent, or Firm* — N.V. Nederlandsch Octrooibureau; Catherine A. Shultz; Katelyn J. Bernier

(57) ABSTRACT

The present invention relates to a composition comprising vegetable oil, caramel and one or more phenolic compounds. The caramel and one or more phenolic compounds together prevent oxidation of the vegetable oil, such that the amount of EDTA in the composition can be reduced. The caramel has been heated such that it does not impart a dark colour to the composition. The invention also relates to a method to prepare the composition. Finally the invention relates to use of caramel and one or more phenolic compounds to decrease the oxidation of vegetable oil.

9 Claims, No Drawings

(56) References Cited

OTHER PUBLICATIONS

Search Report & Written Opinion in PCTEP2016062861, dated Aug. 22, 2016.
Search Report in EP15174544, dated Oct. 9, 2015, EP.
Sengar et al., Food caramels: a review, J Food Sci Technol, 2014, pp. 1686-1696; XP035384505, vol. 51, No. 9, IN.
Tagliazucchi et al., Antioxidant properties of traditional balsamic vinegar and boiled must model systems, Eur Food Res Technol (2008), Jul. 11, 2007, 835-843, 227.
Takenaka Tetsuo et al., Antioxidative activity of caramel on linoleic acid (Glucose-Sodium Citrate System), Database Biosis (Online) 1996 XP002745734 pp. 1, 1996, p. 1; XP002745734.
Written Opinion in EP15174544, dated Oct. 9, 2015, EP.
Written Opinion2 in PCTEP2016062861, dated May 16, 2017.
X. Zhang et al., Impacts of selected dietary polyphenols on caramelization in model systems, Food Chemistry, Jan. 1, 2013, pp. 3451-3458, 141.

C. Severini et al., "Effects of Non-Enzymatic Browning Reactions on Lipid Oxidation in Emulsified Model Systems", Italian Journal of Food Science vol. 10 1998 pp. 147-154.
Pi-Jen Tsai et al., "Interactive role of color and antioxidant capacity in caramels", Food Research International vol. 42, Issue 3, Apr. 2009, pp. 380-386.
Wong-Kyo Jung; Preparation and antioxidant potenital of maillard reaction products from (MPRs) chitooligomer; Food Chemistry; 2014; pp. 173-178; vol. 145.
Tetsuo et al.; Bulletin of the Faculty of Agriculture Tamagawa University; Biosis database; 1996; p. 1 (abstract only); vol. 0, No. 36.
G. C. Lee, et al.; Inhibitory effect of caramelisation products on enzymic browning ; Food Chemistry; 1997; pp. 231-235; 60(2).
Lee, et al.; Inhibition Effects of Caramelization Products from Sugar Solutions Subjected to Different Temperature on Polyphenol Oxidas; J. Korean Soc. Food Sci. Nutr.; 2001; pp. 1041-1046 (abstract in English only); 30(6).

* cited by examiner

COMPOSITION CONTAINING VEGETABLE OIL, CARAMEL AND PHENOLIC COMPOUNDS

FIELD OF THE INVENTION

The present invention relates to a composition comprising vegetable oil, caramel and one or more phenolic compounds. The invention also relates to a method to prepare the composition. Finally the invention relates to use of caramel and one or more phenolic compounds to decrease the oxidation of vegetable oil.

BACKGROUND TO THE INVENTION

Vegetable oil comprising mono-unsaturated or poly-unsaturated fatty acids in food products are prone to oxidation during storage of the food product. This causes rancidity, and leads to rejection of the food product by consumers. Therefore food products often contain antioxidants to prevent oxidation of the vegetable oil, in particular food products which are stored for a relatively long time. A common antioxidant is EDTA (ethylene-diamine-tetra-acetic acid), which binds metal ions which generally promote oxidation of the triglycerides in the vegetable oil. These metal ions may be present as part of common food ingredients. EDTA however is regarded to be chemical and artificial by consumers, therefore there is a need for alternatives which are natural. Within the food industry an increasing effort is made to remove artificial ingredients from food products and to replace them with natural alternatives. Owing to its effectiveness, reasonable cost, and lack of viable alternatives, however, EDTA has so far been one of the more difficult artificial ingredients to replace. Many compounds are known for their antioxidative properties, however not all compounds are sufficiently effective.

WO 96/34535 relates to a dry chocolate flavored beverage mix and a process for making it.

EP 1 446 020 B1 relates to a process for manufacturing a drink, more specifically a soft drink, which is obtained from a mixture of coffee extract with fluid extract of Kola Nut (Cola nitida).

Takenaka Tetsuo et al. (Bulletin of the Faculty of Agriculture Tamagawa University, vol. 0, no. 36, 1996, p. 1-9 (abstract accessible via Biosis database) relates to caramels which are prepared by melting glucose with sodium citrate.

WO 2013/189709 A1 relates to EDTA-free mayonnaise, containing reduced grape juice.

JPH10150949 A2 discloses the use of caramel as an antioxidant for whipped cream, and buttercream. The caramel is prepared using pentoses and/or hexoses as the base raw material. The caramel is prepared by heat treatment for 1 to 10 hours at 120 to 150° C.

CN 101708062 relates to the use of modified tea polyphenols in fatty foods, to improve antioxidant activity.

X. Zhang et al. (Food Chemistry, 141, p. 3451-3458, 2013) investigated the impact of six dietary polyphenols (phloretin, naringenin, quercetin, epicatechin, chlorogenic acid and rosmarinic acid) on fructose caramelization in thermal model systems at either neutral or alkaline pH. Combination of polyphenol and fructose upon preparation of caramel leads to the formation of antioxidants.

P. J. Tsai et al. (Abstracts of Papers, 234th ACS National Meeting, Boston, Mass., USA, Aug. 19-23, 2007, AGFD-191) disclose that a combination of polyphenol and sugars upon preparation of caramel leads to the formation of antioxidants.

C. Severini et al. (Italian Journal of Food Science, 10(2) p. 147-153, 1998) disclose that Maillard reaction products decrease the oxidation rate of soybean oil in an emulsion. These were prepared by heating a combination of lysine and glucose at 90° C. during a time period ranging from 1 to 120 hours. Caramelisation products prepared from glucose at 90° C. during a time period ranging from 1 to 120 hours did not decrease the oxidation rate of soybean oil in an emulsion.

M. L. Chen et al. (International Journal of Food Engineering, vol. 8, iss. 2, art. 15, 2012) relates to the colour development during the caramelisation of acidic glucose solutions at a temperature ranging from 75 to 95° C., during time periods ranging from 500 to 2500 hours. The longer the heating time, the higher the antioxidative activity of the heated sugar.

P. J. Tsai et al. (Food Research International, 42(3), p. 380-386, 2009) also study the formation of coloured compounds during caramelisation of fructose, xylose, glucose, and sucrose at 90° C. during time periods ranging from 4 to 24 hours. The darker the caramel, the stronger the antioxidant activity.

J. S. Kim et al. (Food Science and Biotechnology, 17(5), p. 931-939, 2008) relates to the antioxidative activity of caramelisation products obtained by browning of glucose and fructose solutions at pH 7.0-12.0 and 80-180° C.

SUMMARY OF THE INVENTION

Generally an anti-oxidant is required to prevent oxidation of the triglycerides in vegetable oil in food products, in particular in products which are often stored for a long time. Consumers are more and more interested in food products which are free from ingredients which are perceived to be chemical or artificial. Hence one of the objectives of the present invention is to provide an antioxidant system which can be regarded to be a natural or known ingredient, and is not considered to be an artificial chemical by the consumer. Another objective of the present invention is to provide food products containing vegetable oil containing such antioxidant system, and which are free or nearly free from EDTA. Moreover, oxidation of the triglycerides in the vegetable oil in such food products during storage should nevertheless be as low as possible, therefore it is another objective of the present invention to provide food products having that property. The food product may contain an antioxidant system, and such system should not negatively influence the food products. The prior art indicates that caramel is being used as an antioxidant, in particular when the caramel has been heated a long time, and has a dark colour. However, such dark caramel is not suitable to be used in many light coloured food products, as the food product would become too dark. Therefore it is an objective of the present invention to provide an antioxidant system that does not give an undesired colour to the food product. Additionally it should be perceived to be natural and fitting to the food product. More in particular it is an objective of the present invention to provide a mayonnaise which is free or nearly free from EDTA, and that contains an antioxidant system that does not give an undesired colour to the food product, and that is regarded to be a natural ingredient by the consumer.

We have found a solution to these problems by providing a food product containing vegetable oil, wherein the food product comprises caramel and one or more phenolic compounds. The caramel has been prepared by heating a mixture comprising water and one or more monosaccharides and/or one or more disaccharides in the absence of phenolic compounds during a relatively short time period, in order to prevent that the colour of the caramel is (too) dark.

Accordingly in a first aspect the invention provides a composition in the form of an oil-in-water emulsion comprising vegetable oil comprising mono-unsaturated and/or poly-unsaturated fatty acids, wherein the concentration of the vegetable oil ranges from 5% to 85% by weight of the composition, further comprising caramel and one or more phenolic compounds, wherein the caramel is obtained by heating a mixture comprising one or more monosaccharides and/or one or more disaccharides and water to a temperature ranging from 110° C. to 230° C. during a time period ranging from 30 seconds to 30 minutes, in the absence of phenolic compounds.

The second aspect of the invention provides a method for preparation of a composition according to the first aspect of the invention, comprising the steps:
 (i) providing caramel, wherein the caramel is obtained by heating a mixture comprising one or more monosaccharides and/or one or more disaccharides and water to a temperature ranging from 110° C. to 230° C. during a time period ranging from 30 seconds to 30 minutes, in the absence of phenolic compounds;
 (ii) providing one or more phenolic compounds;
 (iii) providing vegetable oil comprising mono-unsaturated and/or poly-unsaturated fatty acids; and
 (iv) mixing the caramel from step (i) and the one or more phenolic compounds from step (ii) with the vegetable oil from step (iii).

In a third aspect the invention provides the use of caramel and one or more phenolic compounds in a composition comprising vegetable oil comprising mono-unsaturated or poly-unsaturated fatty acids, to reduce the oxidation rate of the vegetable oil, wherein the caramel is obtained by heating a mixture comprising one or more monosaccharides and/or one or more disaccharides and water to a temperature ranging from 110° C. to 230° C. during a time period ranging from 30 seconds to 30 minutes, in the absence of phenolic compounds.

DETAILED DESCRIPTION OF THE INVENTION

All percentages, unless otherwise stated, refer to the percentage by weight (wt %). D4,3 is the volume weighted mean diameter of a set of droplets or particles. The volume based diameter equals the diameter of a sphere that has the same volume as a given particle (M. Alderliesten, Particle & Particle Systems Characterization 8 (1991) 237-241).

"Spoonable" means that a composition is semi-solid but not free-flowing on a time scale typical for eating a meal, meaning not free-flowing within a time period of an hour.

A sample of such substance is able to be dipped with a spoon from a container containing the composition.

Except in the operating and comparative examples, or where otherwise explicitly indicated, all numbers in this description indicating amounts or ratios of material or conditions of reaction, physical properties of materials and/or use are to be understood as modified by the word "about".

In a first aspect the invention provides a composition in the form of an oil-in-water emulsion comprising vegetable oil comprising mono-unsaturated and/or poly-unsaturated fatty acids, wherein the concentration of the vegetable oil ranges from 5% to 85% by weight of the composition, further comprising caramel and one or more phenolic compounds, wherein the caramel is obtained by heating a mixture comprising one or more monosaccharides and/or one or more disaccharides and water to a temperature ranging from 110° C. to 230° C. during a time period ranging from 30 seconds to 30 minutes, in the absence of phenolic compounds.

The term 'oil' as used herein refers to lipids selected from triglycerides, diglycerides, monoglycerides and combinations thereof. Preferably the oil in the context of this invention comprises at least 90 wt % of triglycerides, more preferably at least 95 wt %. Preferably the oil contains less than 20 wt % of solid oil at 5° C., preferably less than 10 wt % solid oil. More preferred the oil is free from solid oil at 5° C. Most preferred the oil is liquid at 5° C. Preferred oils for use in the context of this invention are vegetable oils which are liquid at 5° C. Preferably the oil comprises sunflower oil, rapeseed oil, olive oil, soybean oil, and combinations of these oils. Therefore preferably the vegetable oil is an edible oil. The mono-unsaturated fatty acids as comprised in the oil preferably comprises oleic acid. The poly-unsaturated fatty acids as comprised in the oil preferably comprise linoleic acid and linolenic acid.

The concentration of the vegetable oil ranges from 5% to 85% by weight of the composition. Preferably the composition of the invention comprises from 10% to 80% by weight of vegetable oil, preferably from 15% to 75% by weight of oil. Preferably the amount of oil is at least 20% by weight, preferably at least 30% by weight, preferably at least 35% by weight. Preferably the concentration of vegetable oil is maximally 70% by weight, preferably maximally 65%. Any combination of ranges using these mentioned end points are considered to be part of the invention as well.

The composition is in the form of an oil-in-water emulsion. Preferably the composition is an edible emulsion. Examples of oil-in-water emulsions encompassed by the present invention include mayonnaise, dressings and sauces. Preferably, the oil-in-water emulsion is a mayonnaise or a sauce, most preferably a mayonnaise. Generally such a mayonnaise is spoonable.

Mayonnaise is generally known as a thick, creamy sauce that can be used as a condiment with other foods. Mayonnaise is a stable water-continuous emulsion of vegetable oil, egg yolk and either vinegar or lemon juice. In many countries the term mayonnaise may only be used in case the emulsion conforms to the 'standard of identity', which defines the composition of a mayonnaise. For example, the standard of identity may define a minimum oil level, and a minimum egg yolk amount. Also mayonnaise-like products having oil levels lower than defined in a standard of identity can be considered to be mayonnaises. These kind of products often contain thickeners like starch to stabilise the aqueous phase. Mayonnaise may vary in colour, and is generally white, cream-coloured, or pale yellow. The texture may range from of light creamy to thick, and generally mayonnaise is spoonable. In the context of the present invention 'mayonnaise' includes emulsions with vegetable oil levels ranging from 5% to 85% by weight of the product. Mayonnaises in the context of the present invention do not necessarily need to conform to a standard of identity in any country.

In case the composition of the invention is an oil-in-water emulsion, then the composition comprises an oil-in-water emulsifier. The emulsifier serves to disperse oil droplets in the continuous aqueous phase. Preferably the preferred oil-in-water emulsion of the invention comprises egg yolk. The presence of egg yolk may be beneficial for taste, emulsification and/or stability of the oil droplets in the composition of the invention. Egg yolk contains phospholipids, which act as emulsifier for the oil droplets. Preferably the concentration of egg yolk in the composition of the invention ranges from 1% to 8% by weight of the emulsion, more preferred from 2% to 6% by weight of the emulsion. The egg yolk may be added as egg yolk component, meaning largely without egg white. Alternatively, the composition may also contain whole egg, containing both egg white and egg yolk. The total amount of egg yolk in the composition of the invention includes egg yolk that may be present as part of whole egg. Preferably the concentration of phospholipids originating from egg yolk ranges from 0.05% to 1% by weight, preferably from 0.1% to 0.8% by weight of the emulsion.

Part or all of the egg yolk may have been subjected to an enzymatic conversion process using phospholipase. Preferably the phospholipase that is used to treat egg yolk is phospholipase A2. This process leads to split off of fatty acid chains from the phospholipid molecules, and yields enzyme-modified egg yolk. The reaction products of this enzymatic process are retained in the enzyme-modified egg yolk, meaning that the enzyme-modified egg yolk contains fatty acids split off from the phospholipids. A suitable source of enzyme modified egg yolk is 'Heat stabilised egg yolk (92-8)', supplied by Bouwhuis Enthoven (Raalte, the Netherlands). Preferably the concentration of egg yolk which has been modified by treatment with phospholipase ranges from 0.5% to 4% by weight of the composition, preferably from 1% to 4% by weight of the composition.

Preferably the composition of the invention has a pH ranging from 3 to 5, preferably ranging from 3 to 4.6. Preferably this pH of the composition is obtained by using acetic acid or vinegar. Preferably the composition comprises vinegar selected from apple vinegar, white wine vinegar, red wine vinegar, malt vinegar, and grape must, and any combination of these. These vinegars naturally contain phenolic compounds, and therefore preferably these vinegars serve not only to acidify the composition of the invention, but also as the source of the one or more phenolic compounds. Suitable suppliers of such vinegars are for example Kühne (Hamburg, Germany), Mizkan Euro Ltd. (London, UK), and J. R. Sabater S. A. (Murcia, Spain).

As the combination of caramel and one or more phenolic compounds serve as antioxidant system, preferably the concentration of EDTA is lower than 0.005% by weight, preferably lower than 0.002% by weight of the composition. More preferred the concentration of EDTA is lower than 0.001% by weight, and most preferred EDTA is absent from the composition of the invention. The advantage of the combination of the caramel and the one or more phenolic compounds is that it can at least partly, or even completely replace EDTA, and serve as an antioxidant for the vegetable oil in the composition.

The caramel is obtained by mixing one or more monosaccharides and/or one or more disaccharides and water, and heating the mixture. Preferably the mixture is agitated while being heated, in order to obtain a homogeneous temperature of the mixture. Preferably the ratio between on the one hand one or more monosaccharides and/or one or more disaccharides and on the other hand water in the mixture that is heated to obtain the caramel, ranges from 5:1 to 1:5 by weight, preferably the ratio ranges from 5:1 to 1:2 by weight. Most preferred the ratio between one or more monosaccharides and/or one or more disaccharides and water ranges from 2:1 to 1:1 by weight. Preferably this mixture has a pH ranging from 3 to 10, more preferred from 3.5 to 8, more preferred from 4 to 7.5, and most preferred from 6.5 to 7.5.

Caramel is considered to be a common food ingredient, as it is prepared by heating natural sugar. Therefore many consumers regard caramel to be natural.

Preferably the one or more disaccharides that is heated to obtain the caramel comprises sucrose. Preferably the caramel is prepared from sucrose as the only disaccharide, without monosaccharide. Preferably the caramel is prepared by heating sucrose dissolved in water at its natural pH, so without any other additives.

Preferably the one or more monosaccharides that is heated to obtain the caramel comprises fructose or glucose, or a combination of the two. In case a combination is used, then preferably fructose and glucose are present at a weight ratio ranging from 10:1 to 1:10.

The mixture containing one or more monosaccharides and/or one or more disaccharides and water, is heated to a temperature ranging from 110° C. to 230° C. during a time period ranging from 30 seconds to 30 minutes to obtain the caramel. This has to be interpreted as that the mixture is within this temperature range during the indicated time period. Any time required to for example heating the mixture from room temperature to 110° C. is not included in the indicated time period. Usually when the mixture is heated, water evaporates first and temperature remains about 100° C. until the water has been evaporated. Subsequently the temperature increases again. The temperatures and time periods herein relate to atmospheric conditions.

The heating within the indicated range does not require to be performed in once, during the heating process water may be added to the heated mixture, such that the temperature of the mixture decreases, and subsequently rises again after evaporation of that additional water amount. This may be repeated once or more times, therefore possibly creating a varying temperature of the mixture. The temperature of the mixture should in total be between 110° C. and 230° C. during a period ranging from 30 seconds to 30 minutes.

Preferably the mixture is heated to a temperature ranging from 150° C. to 230° C. during a time period ranging from 30 seconds to 10 minutes. Preferably the mixture is heated to a temperature ranging from 170° C. to 230° C. during a time period ranging from 30 seconds to 8 minutes. Preferably the mixture is heated to a temperature ranging from 180° C. to 230° C. during a time period ranging from 30 seconds to 5 minutes, preferably from 40 seconds to 3 minutes to obtain the caramel. More preferred the mixture is heated during a time period preferably from 40 seconds to 2 minutes to obtain the caramel, more preferred from 40 seconds to 90 seconds. The temperature preferably ranges from 180° C. to 220° C., more preferred from 190° C. to 220° C., more preferred from 200° C. to 220° C., and more preferred from 200° C. to 210° C.

Preferably the concentration of the caramel ranges from 0.5% to 5%, preferably from 0.5% to 3% by weight of the composition. More preferred the concentration ranges from 1% to 3% by weight of the composition.

The advantage of the caramels used in the present invention, is that they have a relatively bland, light colour, such that they are not very dark and do not give much colour to the composition in which they are incorporated. The colour of the caramels can be determined by dissolving at 10% by weight in water, and determining the L*, a*, and b* values according to the CIE colour space. Comparison with water provides the colour of the caramel, by determining the $\Delta E^*$ value, which is determined using the following formula:

$$\Delta E^* = (\Delta L^{*2} + \Delta a^{*2} + \Delta b^{*2})^{1/2}$$

The higher the L* value, the more translucent a sample. A dark sample has a low L* value. The higher the a* value, the more reddish the sample. Preferably a 10% by weight solution of the caramel in water has a colour value L* ranging from 5 to 67, and an a* value ranging from −5 to 35, and a b* value ranging from 5 to 75. Preferably the value of L* ranges from 10 to 65, more preferred from 20 to 65, more preferred from 30 to 65. Preferably the value of a* ranges from −2 to 30, more preferred from −1 to 25. Preferably the value of b* ranges from 10 to 70, more preferred from 15 to 60. Preferably the value of ΔE* as compared to water ranges from 0 to 75, more preferred from 0 to 70, more preferred from 0 to 60.

Phenolic compounds can be found in nature in many types. One or more phenolic compounds used in the composition may be added as separate ingredients. Preferably though the one or more phenolic compounds are added to the composition as an element of another ingredient in the composition of the invention, for example in the vinegars mentioned herein before. Preferably the one or more phenolic compounds comprise one or more compounds from the group consisting of 3,4-dihydroxy-benzoic acid, syringic acid, p-coumaric acid, gallic acid, caffeic acid, trans-ferulic acid, vanillic acid, and DL-catechin hydrate.

A common method to determine the phenolic compounds concentration of a sample, is the concentration in "gallic acid equivalents" (GAE). Whenever reference is made herein to "gallic acid equivalents" what is meant is the amount of gallic acid equivalents as determined by the Folin-Ciocalteu assay. Gallic acid (3,4,5-trihydroxybenzoic acid) is the phenolic acid that is used as a standard for determining the phenol content of various analyses by the Folin-Ciocalteu assay (see V. L. Singleton et al., Analysis of total phenols and other oxidation substrates and antioxidants by means of Folin-Ciocalteu reagent, Methods in Enzymology 299, 152-178, 1999).

Preferably the total concentration of the one or more phenolic compounds in the composition of the invention ranges from 0.0001 to 0.1 wt % GAE. More preferred the concentration of the one or more phenolic compounds ranges from 0.0002 to 0.05 wt % GAE.

If not expressed as gallic acid equivalents, preferably the total concentration of the one or more phenolic compounds ranges from 0.0001% to 0.1% by weight of the composition. More preferred the concentration of the one or more phenolic compounds ranges from 0.0002 to 0.05% by weight of the composition.

If expressed as individual concentration of the preferred one or more phenolic compounds, the following concentrations are preferred in the composition of the invention:
  3,4-dihydroxy-benzoic acid: 0.001-0.002 wt %, and/or
  syringic acid: 0.001-0.002 wt %, and/or
  p-coumaric acid: 0.0015-0.0025 wt %, and/or
  gallic acid·$H_2O$: 0.0005-0.0015 wt %, and/or
  caffeic acid: 0.00065-0.00075 wt %, and/or
  trans-ferulic acid: 0.0005-0.0015 wt %, and/or
  vanillic acid: 0.0007-0.0008 wt %, and/or
  DL-catechin hydrate: 0.0075-0.0085 wt %.

The composition of the invention may contain a structurant to stabilise the water phase and to thicken the composition, in particular for products with low oil levels, for example less than 60% oil. Many structurants are oligomers or polymers from vegetable, microbial, or animal origin. The structurants can be water-soluble or water-insoluble, and they may be used native or in chemically or physically modified form. Examples of structurants from vegetable origin are water-soluble polysaccharides like native starches, chemically modified starches, carrageenan, locust bean gum, carboxymethyl cellulose, and pectin. Also oligosaccharides and polysaccharides present in corn syrup or glucose syrup may be used as structurant in mayonnaise-type emulsions. Additionally proteins from vegetable origin may be used as structurant in oil-in-water emulsions, for example ground pulse seed may be used to provide structure to an emulsion. Examples of water-insoluble structurants from vegetable origin are cellulosic fibres like citrus fibres and tomato fibres. Examples of structurants from microbial or algae origin are the polysaccharides xanthan gum, agar, and alginate. Examples of polymeric structurants from animal origin are proteins like casein from cow's milk and gelatin.

The composition of the invention may suitably contain one or more additional ingredients. Examples of such optional ingredients include salt, spices, sugars (in particular mono- and/or disaccharides), mustard, vitamins, flavouring, colouring, preservatives, antioxidants, herbs and vegetable pieces. Such optional additives, including the structurants, when used, collectively do not make up more than 40%, more preferably not more than 20% by weight of the emulsion.

Method for Preparation of a Composition According to the Invention

In a second aspect the present invention provides a method for preparation of a composition according to the first aspect of the invention, comprising the steps:
  (i) providing caramel, wherein the caramel is obtained by heating a mixture comprising one or more monosaccharides and/or one or more disaccharides and water to a temperature ranging from 110° C. to 230° C. during a time period ranging from 30 seconds to 30 minutes, in the absence of phenolic compounds;
  (ii) providing one or more phenolic compounds;
  (iii) providing vegetable oil comprising mono-unsaturated and/or poly-unsaturated fatty acids; and
  (iv) mixing the caramel from step (i) and the one or more phenolic compounds from step (ii) with the vegetable oil from step (iii).

Preferably the caramel in step (i) is mixed with water first to create a solution of the caramel in water. In step (iv) the mixing of the various compounds is done in no particular order. Other optional ingredients of the composition that is prepared may be mixed with caramel in step (i), or with the one or more phenolic compounds in step (ii), or with the oil in step (iii) before these ingredients are mixed in step (iv). Other optional ingredients may be mixed with the ingredients after step (iv).

The second aspect of the invention also provides a method for preparation of the oil-in-water emulsion according to the first aspect of the invention. Therefore the present invention provides a method for preparation of a composition in the form of an oil-in-water emulsion, comprising the steps:
  (i) providing an aqueous mixture comprising an oil-in-water emulsifier, and comprising caramel, wherein the caramel is obtained by heating a mixture comprising one or more monosaccharides and/or one or more disaccharides and water to a temperature ranging from 110° C. to 230° C. during a time period ranging from 30 seconds to 30 minutes, in the absence of phenolic compounds;
  (ii) mixing vegetable oil comprising mono-unsaturated and/or poly-unsaturated fatty acids with the mixture from step (i) to prepare an oil-in-water emulsion; and
  (iii) providing one or more phenolic compounds and adding these to the mixture from step (ii) and simultaneously or subsequently adding an acid to the mixture from step (ii) to bring the pH of the mixture to a value between 3 and 5.

In step (i), the aqueous mixture may contain other optional water soluble ingredients, like sugars, salt, flavours, mustard. Preferably all caramel present in the composition of the invention is present in the mixture of step (i). The oil-in-water emulsifier preferably comprises phospholipids originating from egg yolk. In step (ii) the oil is dispersed in the aqueous mixture from step (i), and preferably the mixture is homogenised during a time period long enough to create an oil-in-water emulsion wherein the oil droplets have a volume weighted mean droplet size D4,3 of less than 10 micrometer, preferably ranging from 0.3 to 10 micrometer, preferably ranging from 0.5 to 8 micrometer. This mean diameter may suitably be determined using the method described by Goudappel et al. (Journal of Colloid and Interface Science 239, p. 535-542, 2001). Preferably, 80 to 100% of the total volume of the oil droplets contained in the present emulsion have a diameter of less than 15 micrometer, more preferably a diameter ranging from 0.5 to 10 micrometer.

The homogenisation may be done using a conventional mixer for preparing oil-in-water emulsions, such as a colloid mill, or another mill as described in WO 02/069737 A2. A suitable supplier of such emulsification equipment is Charles Ross & Son Company, (Hauppauge, N.Y., USA).

In step (iii) the one or more phenolic compounds are added to the oil-in-water emulsion from step (ii). Preferably all phenolic compounds present in the composition of the invention are added in step (iii). Also acidification to bring the pH of the oil-in-water emulsion to a value between 3 and 5, preferably between 3 and 4.6, is done in this step (iii). In case vinegar is the source of the one or more phenolic compounds, as described herein before, then the addition of one or more phenolic compounds and acidification take place simultaneously.

Alternatively the second aspect provides a method for preparation of the oil-in-water emulsion according to the first aspect of the invention. Therefore the present invention also provides a method for preparation of a composition in the form of an oil-in-water emulsion, comprising the steps:
(i) providing an aqueous mixture comprising an oil-in-water emulsifier;
(ii) mixing vegetable oil comprising mono-unsaturated and/or poly-unsaturated fatty acids and with the mixture from step (i) to prepare an oil-in-water emulsion;
(iii) providing a mixture of caramel and one or more phenolic compounds, wherein the caramel is obtained by heating a mixture comprising one or more monosaccharides and/or one or more disaccharides and water to a temperature ranging from 110° C. to 230° C. during a time period ranging from 30 seconds to 30 minutes, in the absence of phenolic compounds; and
(iv) mixing the mixture from step (iii) with the mixture from step (ii) and simultaneously or subsequently adding an acid to the mixture from step (ii) to bring the pH of the mixture to a value between 3 and 5.

In step (i), the aqueous mixture may contain other optional water soluble ingredients, like sugars, salt, flavours, mustard. The oil-in-water emulsifier preferably comprises phospholipids originating from egg yolk. Similarly as described before, in step (ii) the oil is dispersed in the aqueous mixture from step (i), and preferably the mixture is homogenised during a time period long enough to create an oil-in-water emulsion wherein the oil droplets have a volume weighted mean droplet size D4,3 of less than 10 micrometer, preferably ranging from 0.3 to 10 micrometer, preferably ranging from 0.5 to 8 micrometer. Preferably, 80 to 100% of the total volume of the oil droplets contained in the present emulsion have a diameter of less than 15 micrometer, more preferably a diameter ranging from 0.5 to 10 micrometer.

In step (iii) a mixture of the caramel and the one or more phenolic compounds is prepared. Preferably this is done in an aqueous mixture. Preferably this mixture contains all phenolic compounds and caramel present in the composition of the invention. In case a vinegar is the source of the one or more phenolic compounds as described herein before, the caramel may be added to that vinegar. This mixture is then added to the oil-in-water emulsion from step (ii) in step (iv). Also acidification to bring the pH of the oil-in-water emulsion to a value between 3 and 5, preferably between 3 and 4.6, is done in this step. In case vinegar is the source of the one or more phenolic compounds, then addition of caramel, one or more phenolic compounds and acidification take place simultaneously.

Preparation of this premix in step (iii) may have the advantage that the antioxidant effect of the combination of caramel and one or more phenolic compounds is stronger than when caramel and one or more phenolic compounds are not added simultaneously.

Preferably the concentration of EDTA is lower than 0.005% by weight of the composition, preferably lower than 0.002% by weight of the composition. More preferred the concentration of EDTA is lower than 0.001% by weight, and most preferred EDTA is absent from the composition.

Preferred features as described in the context of the first aspect of the invention, are applicable to this second aspect of the invention as well, mutatis mutandis.

Use of Caramel and One or More Phenolic Compounds

In a third aspect the invention provides use of caramel and one or more phenolic compounds in a composition comprising vegetable oil comprising mono-unsaturated or poly-unsaturated fatty acids, to reduce the oxidation rate of the vegetable oil, wherein the caramel is obtained by heating a mixture comprising one or more monosaccharides and/or one or more disaccharides and water to a temperature ranging from 110° C. to 230° C. during a time period ranging from 30 seconds to 30 minutes, in the absence of phenolic compounds. Preferably the composition is in the form of an oil-in-water emulsion. Preferably the concentration of the vegetable oil ranges from 5% to 85% by weight of the composition.

In a third aspect the invention provides a method to reduce the oxidation rate of vegetable oil comprising mono-unsaturated or poly-unsaturated fatty acids in a composition, by using caramel and one or more phenolic compounds in that composition, wherein the caramel is obtained by heating a mixture comprising one or more monosaccharides and/or one or more disaccharides and water to a temperature ranging from 110° C. to 230° C. during a time period ranging from 30 seconds to 30 minutes, in the absence of phenolic compounds. Preferably the composition is in the form of an oil-in-water emulsion. Preferably the concentration of the vegetable oil ranges from 5% to 85% by weight of the composition.

Preferably the concentration of EDTA is lower than 0.005% by weight of the composition, preferably lower than 0.002% by weight of the composition. More preferred the concentration of EDTA is lower than 0.001% by weight, and most preferred EDTA is absent from the composition.

Preferred features as described in the context of the first or second aspect of the invention, are applicable to this third aspect of the invention as well, mutatis mutandis.

EXAMPLES

The following non-limiting examples illustrate the present invention.

Raw Materials

Water: demineralised water is used in all experiments.

Soybean oil ex Cargill (Amsterdam, The Netherlands).

Sugar: sucrose white sugar W4 ex Suiker Unie (Oud Gastel, Netherlands).

Sorbic acid: ex Univar (Zwijndrecht, Netherlands).

Salt: NaCl suprasel ex Akzo Nobel (Amersfoort, Netherlands).

EDTA: Ethylenediaminetetraacetic acid, calcium disodium complex, dehydrate; Dissolvine E-CA-10 ex Akzo Nobel (Amersfoort, Netherlands).

Stabilized egg yolk: Heat stabilised egg yolk (92-8), ex Bouwhuis Enthoven (Raalte, the Netherlands); contains 92% egg yolk modified with phospholipase A2 enzyme and 8% table salt (fragments are retained in the product).

Fructose: ex Suiker Unie (Oud Gastel, Netherlands).

White wine vinegar: White wine vinegar 10% ex Kühne (Hamburg, Germany).

Apple vinegar: Amora Cider Vinegar ex Unilever France (Paris, France).

Acetic acid: 100% ex Sigma-Aldrich (St. Louis, Mo., USA).

Spirit vinegar: 12% acetic acid) ex Mizkan (UK).

Lemon juice: concentrate 45° brix ex Döhler (Darmstadt, Germany).

Phenolic compounds mix: the following phenolic compounds were obtained from Sigma-Aldrich (St. Louis, Mo., USA), and these were dissolved in demineralised water to create a stock solution of phenolic compounds as indicated in Table 1. After dissolution the pH of the solution was 3.1, and this was brought to 3.4 with diluted NaOH. This solution is used in subsequent experiments.

TABLE 1

Composition of mixture of phenolic compounds in water

| Compound | Concentration [mg/kg] | Mw [g/mol] | Molar concentration [mM] |
|---|---|---|---|
| 3,4-dihydroxy-benzoic acid | 287 | 154.16 | 1.86 |
| syringic acid | 339 | 198.17 | 1.71 |
| p-coumaric acid | 375 | 164.16 | 2.28 |
| gallic acid•$H_2O$ | 225 | 188.16 | 1.20 |
| caffeic acid | 141 | 180.16 | 0.78 |
| trans-ferulic acid | 212 | 194.16 | 1.09 |
| vanillic acid | 147 | 168.15 | 0.87 |
| DL-catechin hydrate | 1631 | 290.28 | 5.63 |

Methods—Accelerated Shelf-Life Test to Follow Lipid Oxidation.

Vegetable oil is subjected to conditions which promote oxidation, without requiring the typical shelf life of 4 to 9 months of mayonnaise.

Mayonnaise samples with various compositions are prepared (as described in the examples below) and 1 g of each sample is filled in a capped glass vial (20 mL volume) and kept in a temperature controlled oven at 50° C. Oxidation experiments are carried out during a period up to 42 days and at several time points a sample is picked for headspace-GC-MS measurement of volatile oxidation markers (e.g. hexanal). Usually every data point is measured in triplo. The measurements are performed on a GC-MS combination of Agilent (7890A/5975C). The GC column used is a DB-Wax (20m-0.18d-0.3 μm) from J&W. The injection volume is 500 μL with a split of 40:1 and a column flow of 1 ml/min. Total nine volatiles (mainly aldehydes and alkanes—considered as marker for lipid oxidation) are analysed, of which hexanal is the most important marker, and reported in here. The hexanal response is given in arbitrary units—the higher the response the more hexanal and the more oxidation of triglycerides.

The oxidation of triglycerides occurs in several steps, in which the first step is the most important. This first step is the lag phase, which is the phase where there is not much oxidation, and after this phase the oxidation starts to accelerate. This means that the amount of oxidation products rapidly starts to increase. The longer the lag phase, the slower the oxidation process, and the better the result.

Example 1

Preparation of Caramels

Caramels based on sucrose were prepared in the following way. For all samples A to G in Table 2, 400 gram sucrose was added to 300 gram water, and pH adjusted with hydrochloric acid or sodium hydroxide to obtain pH 4 or 7. The solution was heated in a pan on an induction plate. The solution was stirred with a spoon during heating. After reaction was stopped (when the required temperature was reached), the product was poured out of the pan on a flat plate to cool down. The caramel became solid upon cooling on the plate.

TABLE 2

Description of caramel samples.

| Sample | pH | Pan type | Final temperature [° C.] |
|---|---|---|---|
| A | 4 | 15 cm diameter | 201 |
| B | 4 | 15 cm diameter | 200 |
| C | 7 | 15 cm diameter | 202 |
| D | 7 | 17 cm diameter | 217 |
| E | 7 | 17 cm diameter | 203 |
| F | 7 | 17 cm diameter | 180 |
| G | 7 | 17 cm diameter | >220 |

The caramels were used to evaluate the impact of temperature increase during caramel making due to different parameters: pH, evaporation rate (relating to pan diameter), and end temperature. Using a larger pan, leads to faster evaporation of water and quicker increase of temperature of the sugar.

The typical heating profile of samples C and E is given in the following table, showing the difference in time between the smaller and the larger pan. These profiles are typical for other caramel samples as well, and are shown to illustrate the temperature profile during the preparation of caramel.

TABLE 3

Temperature profile of caramel samples C and E from Table 2.

| Time [sec] | Temperature [° C.] |
|---|---|
| Caramel Sample C | |
| 0 | 19 |
| 40 | 38.9 |
| 80 | 48 |
| 120 | 62.8 |
| 160 | 76.3 |
| 200 | 89.3 |
| 220 | 99.3 |
| 260 | 103 |
| 320 | 103.3 |
| 400 | 103.5 |
| 460 | 104 |
| 520 | 103.8 |
| 560 | 104.3 |
| 620 | 105.7 |
| 680 | 107.2 |
| 720 | 106.9 |
| 760 | 108.5 |
| 800 | 110 |
| 840 | 111.3 |
| 880 | 114.6 |
| 920 | 117.9 |
| 960 | 120.8 |
| 1000 | 126.6 |
| 1040 | 132.2 |
| 1080 | 142 |
| 1100 | 148.1 |
| 1120 | 145.4 |
| 1140 | 160.1 |
| 1160 | 167.5 |
| 1180 | 177 |
| 1200 | 185.3 |
| 1220 | 193.5 |
| 1240 | 202 |
| Caramel Sample E | |
| 0 | 19 |
| 20 | 27.4 |
| 40 | 38.9 |
| 60 | 52.1 |
| 80 | 62.5 |
| 100 | 74.9 |
| 120 | 86.7 |
| 140 | 96 |
| 160 | 103.3 |
| 180 | 99.4 |
| 200 | 102 |
| 240 | 103 |
| 280 | 105.2 |
| 300 | 104.8 |
| 320 | 103 |
| 360 | 106.1 |
| 400 | 106.3 |
| 440 | 109.9 |
| 480 | 113.2 |
| 500 | 116.7 |
| 520 | 119.1 |
| 540 | 123.3 |
| 560 | 132.8 |
| 600 | 142 |
| 620 | 148 |
| 640 | 156.9 |
| 660 | 165.6 |
| 680 | 172 |
| 700 | 186.5 |
| 720 | 195.8 |
| 740 | 203 |

The heating of the caramel shows that rapid heating to a temperature of about 100° C. is achieved, temperature remains more or less constant when the water evaporates, followed by rapid increase to a higher temperature when the water has evaporated.

The colour of these caramels was determined, by making a 10 wt % solution of each caramel in water, by using the CIE Lab colour space. The equipment used was a DigeEye colour imaging system, Nikon D70, with 3008×2000 px. The higher the L* value, the more translucent the sample. A dark sample has a low L* value. The higher the a* value, the more reddish the sample. A comparison is made between pure water, by determining the ΔE* value, which is determined using the following formula:

$$\Delta E^* = (\Delta L^{*2} + \Delta a^{*2} + \Delta b^{*2})^{1/2}$$

The difference for each parameter against water is made. The colour measurement results are shown in Table 4:

TABLE 4

L*a*b* colour measurement of 10% caramel in water, samples from Table 2.

| Sample | L* | a* | b* | ΔE |
|---|---|---|---|---|
| A | 55.9 | 6.6 | 63.8 | 63.0 |
| B | 50.7 | 14.4 | 71.4 | 72.7 |
| C | 53.1 | 10.2 | 67.2 | 67.4 |
| D | 35.1 | 30.3 | 58.6 | 72.0 |
| E | 51.5 | 12.7 | 69.5 | 70.3 |
| F | 64.5 | -2.3 | 19.5 | 17.6 |
| G | 10.6 | 29.2 | 17.4 | 66.3 |
| water | 67.9 | -0.4 | 2.3 | 0 |

This table shows that the samples which have been heated up to the highest temperature (D, G), have the lowest L* value (meaning darkest sample).

Similarly as the caramels in Table 2, more caramel samples were prepared to different end temperatures, and the time required to reach that specific temperature differed (from 9 to 12 minutes, starting at 0 at room temperature). Sucrose and fructose were used as sugars to prepare caramels, see Table 5.

TABLE 5

Description of caramel samples based on sucrose or fructose, heated during various times.

| Sample | Sugar | pH | Final temperature [° C.] | Time used to reach final temperature from room temperature [min:sec] |
|---|---|---|---|---|
| H | sucrose | 7 | 158 | 9:00 |
| J | sucrose | 7 | 180 | 10:30 |
| K | sucrose | 7 | 230 | 12:00 |
| L | fructose | 7 | 200 | 12:00 |
| M | sucrose | 7 | 180 | 12:00 |

Example 2

Caramels in Mayonnaise

Caramels from Table 2 in example 1 were used to prepare mayonnaises according to the recipes in Table 6. As comparison mayonnaises containing EDTA were prepared as well, without caramel.

TABLE 6

Recipes of mayonnaises containing various caramels.

| Ingredient | Mayonnaise 2-1 conc. [wt %] | 2-2 conc. [wt %] | 2-3 conc. [wt %] | 2-4 conc. [wt %] | 2-5 conc. [wt %] | 2-6 conc. [wt %] |
|---|---|---|---|---|---|---|
| soybean oil | 75 | 75 | 75 | 75 | 75 | 75 |
| stabilised egg yolk | 4.2 | 4.2 | 4.2 | 4.2 | 4.2 | 4.2 |
| acetic acid | 0.3 | 0.3 | 0 | 0 | 0 | 0 |
| white wine vinegar | 0 | 0 | 3 | 3 | 3 | 3 |
| sucrose | 1.3 | 1.3 | 1.3 | 1.3 | 1.3 | 1.3 |
| salt (NaCl) | 1.3 | 1.3 | 1.3 | 1.3 | 1.3 | 1.3 |
| flavour | 0.2 | 0.2 | 0.2 | 0.2 | 0.2 | 0.2 |
| EDTA | 0.0075 | 0 | 0 | 0 | 0 | 0 |
| Caramel sample B | | | | 2 | | |
| Caramel sample C | | | | | 2 | |
| Caramel sample D | | | | | | 2 |
| Caramel sample E | | | | | | |
| Caramel sample F | | | | | | |
| Caramel sample G | | | | | | |
| Water | to 100% | to 100% | to 100% | to 100% | to 100% | to 100% |

| Ingredient | Mayonnaise 2-7 conc. [wt %] | 2-8 conc. [wt %] | 2-9 conc. [wt %] |
|---|---|---|---|
| soybean oil | 75 | 75 | 75 |
| stabilised egg yolk | 4.2 | 4.2 | 4.2 |
| acetic acid | 0 | 0 | 0 |
| white wine vinegar | 3 | 3 | 3 |
| sucrose | 1.3 | 1.3 | 1.3 |
| salt (NaCl) | 1.3 | 1.3 | 1.3 |
| flavour | 0.2 | 0.2 | 0.2 |
| EDTA | 0 | 0 | 0 |
| Caramel sample B | | | |
| Caramel sample C | | | |
| Caramel sample D | | | |
| Caramel sample E | 2 | | |
| Caramel sample F | | 2 | |
| Caramel sample G | | | 2 |
| Water | to 100% | to 100% | to 100% |

The mayonnaises were prepared by first preparing an aqueous phase, which was prepared by mixing water, egg yolk, sucrose, salt, caramel, and EDTA, as applicable. Subsequently oil was slowly added to the aqueous phase, while mixing with a high shear mixer (Silverson). The oil was added in about 10 minutes, while the mixing speed was slowly increased from about 1600 to about 7200 rpm. After the oil had been homogenised, and the emulsion had become smooth, acetic acid and/or vinegar were slowly added while the mixer was kept at 7200 rpm. The final pH of the mayonnaises after acidification was adjusted to 3.9 before subjecting these to oxidation measurements (using sodium hydroxide if pH after addition of vinegar was lower than 3.9).

As the caramel samples were solid and brittle, the samples were crushed into small pieces first, and then dissolved in water to create 40% stock solutions. These stock solutions were used in the experiments to prepare the emulsions.

The phenolic compounds present in the mayonnaises in Table 6 originate from the white wine vinegar. The concentration of phenolic compounds in the white wine vinegar is estimated to be about 80 µg/mL as gallic acid equivalents (GAE) (see P. Pinsirodom, Asian Journal of Food and Agro-Industry, 3(04), p. 389-397, 2010). This means that the concentration of phenolic compounds in samples 2-3 to 2-9 is estimated to be about 0.00024% GAE.

The mayonnaises were subjected to oxidation tests as described above, and the length of the lag phase was determined. The results are shown in the following table. Each data point is based on two duplicates or three triplicates, of which the average value is given.

TABLE 7

Hexanal response × $10^{-6}$ (arbitrary units) in accelerated oxidation test of mayonnaises from Table 6 and standard deviation in the response data points.

| Time [days] | sample 2-1 response | st. dev. | 2-2 response | st. dev. | 2-3 response | st. dev. |
|---|---|---|---|---|---|---|
| 0 | 0.01 | 0.00 | 0.03 | 0.01 | 0.02 | 0.01 |
| 2 | 0.01 | 0.01 | 0.51 | 0.05 | 0.17 | 0.05 |
| 4 | 0.02 | 0.01 | 1.42 | 0.08 | 0.76 | 0.08 |
| 7 | 0.03 | 0.01 | 2.12 | 0.36 | 1.65 | 0.05 |
| 9 | 0.05 | 0.03 | 4.33 | 1.02 | 2.21 | 0.16 |
| 11 | 0.05 | 0.01 | 8.62 | 0.91 | 6.36 | 4.20 |
| 14 | 0.07 | 0.01 | 4.32 | 0.65 | 6.21 | 1.64 |
| 16 | 0.14 | 0.06 | 12.94 | 7.15 | 6.35 | 3.05 |
| 18 | 0.21 | 0.03 | 26.17 | 19.18 | 6.38 | 0.64 |
| 21 | 0.24 | 0.01 | 9.89 | 4.33 | 23.40 | 9.53 |
| 23 | 0.39 | 0.09 | 10.59 | 5.18 | 19.47 | 26.27 |

TABLE 7-continued

Hexanal response × $10^{-6}$ (arbitrary units) in accelerated oxidation test of mayonnaises from Table 6 and standard deviation in the response data points.

| | | | | | | |
|---|---|---|---|---|---|---|
| 25 | 1.85 | 0.80 | 17.14 | 20.57 | 12.31 | 12.47 |
| 28 | 0.50 | 0.19 | 44.37 | 33.53 | 9.99 | 5.13 |
| 31 | 0.60 | 0.09 | | | | |

| | sample | | | | | |
|---|---|---|---|---|---|---|
| | 2-4 | | 2-5 | | 2-6 | |
| Time [days] | response | st. dev. | response | st. dev. | response | st. dev. |
| 0 | 0.02 | 0.00 | 0.02 | 0.00 | 0.02 | 0.00 |
| 2 | 0.12 | 0.00 | 0.12 | 0.01 | 0.12 | 0.01 |
| 4 | 0.22 | 0.02 | 2.55 | 3.96 | 0.35 | 0.15 |
| 7 | 0.44 | 0.05 | 0.52 | 0.05 | 0.45 | 0.03 |
| 9 | 0.66 | 0.07 | 0.86 | 0.06 | 0.64 | 0.11 |
| 11 | 1.38 | 0.37 | 1.90 | 0.16 | 1.10 | 0.09 |
| 14 | 8.72 | 2.88 | 4.69 | 1.24 | 5.47 | 2.12 |
| 16 | 5.92 | 3.39 | 9.94 | 2.05 | 6.13 | 2.09 |
| 18 | 19.25 | 11.90 | 9.81 | 6.13 | 19.85 | 1.61 |
| 21 | 11.05 | 7.66 | 16.21 | 4.66 | 10.70 | 7.16 |
| 23 | 26.80 | 17.72 | 11.21 | 1.77 | 24.36 | 15.83 |
| 25 | 23.95 | 15.73 | 15.27 | 10.54 | 18.28 | 10.60 |
| 28 | 37.36 | 3.04 | 13.06 | 12.38 | 6.15 | 1.00 |

| | sample | | | | | |
|---|---|---|---|---|---|---|
| | 2-7 | | 2-8 | | 2-9 | |
| Time [days] | response | st. dev. | response | st. dev. | response | st. dev. |
| 0 | 0.01 | 0.01 | 0.02 | 0.00 | 0.02 | 0.00 |
| 2 | 0.13 | 0.02 | 0.20 | 0.03 | 0.12 | 0.05 |
| 4 | 0.94 | 1.20 | 0.86 | 0.12 | 0.16 | 0.01 |
| 7 | 0.34 | 0.29 | 1.39 | 0.12 | 0.30 | 0.00 |
| 9 | 1.13 | 0.21 | 2.05 | 0.30 | 0.38 | 0.02 |
| 11 | 2.75 | 0.36 | 4.03 | 0.38 | 0.63 | 0.10 |
| 14 | 7.83 | 1.49 | 6.58 | 3.83 | 0.81 | 0.08 |
| 16 | 9.90 | 5.23 | 4.43 | 0.25 | 1.80 | 0.57 |
| 18 | 17.07 | 5.41 | 9.91 | 5.84 | 3.29 | 0.97 |
| 21 | 16.37 | 4.91 | 8.45 | 3.69 | 6.36 | 0.87 |
| 23 | 13.24 | 7.04 | 25.08 | 9.89 | 10.48 | 4.23 |
| 25 | 7.21 | 0.45 | 6.08 | 0.85 | 19.32 | 5.38 |
| 28 | 14.54 | 1.71 | 27.49 | 11.63 | 13.48 | 6.90 |

Based on the hexanal response, the length of the lag phase can be determined, counting from the day at which the oxidation test was started. This is given in the following table.

TABLE 8

Length of lag phase, based on hexanal response from Table 7.

| Sample | Length of lag phase [days] |
|---|---|
| 2-1 (+EDTA) | ~23 |
| 2-2 (no EDTA) | ~2 |
| 2-3 (only white wine vinegar, no car.) | ~4 |
| 2-4 (car. B) | ~11 |
| 2-5 (car. C) | ~11 |
| 2-6 (car. D) | ~11 |
| 2-7 (car. E) | ~9 |
| 2-8 (car. F) | ~7 |
| 2-9 (car. G) | ~16 |

These results show that the addition of caramels leads to a shift of the lag phase, such that rapid oxidation is delayed as compared to samples containing no EDTA (2-2). The presence of white wine vinegar leads to delay of the oxidation rate (2-3), although the caramels are required to further extend the lag time. The sample containing EDTA (2-1) performs better than the caramels, nevertheless as EDTA is considered to be an artificial chemical for a food product, the use of caramel is preferred. Caramel is considered to be a common food ingredient, as it is prepared by heating natural sugar.

The temperature is the factor that determines the antioxidant activity of caramel: the higher the better. On the other hand, a higher temperature leads to a darker colour of the caramel (as seen in Table 4), thus makes the caramel less suitable for use in a mayonnaise when the colour of the mayonnaise should remain white-pale-yellowish. The pH (4 vs. 7) during preparation of caramel did not have a major influence on the antioxidant activity.

Example 3

Caramels in Mayonnaise

Caramels from Table 5 in example 1 were used to prepare mayonnaises according to the recipes in Table 9. As comparison mayonnaises containing EDTA were prepared as well, without caramel.

TABLE 9

Recipe of mayonnaises containing various caramels.

| | Mayonnaise | | | | | |
|---|---|---|---|---|---|---|
| Ingredient | 3-1 conc. [wt %] | 3-2 conc. [wt %] | 3-3 conc. [wt %] | 3-4 conc. [wt %] | 3-5 conc. [wt %] | 3-6 conc. [wt %] |
| soybean oil | 75 | 75 | 75 | 75 | 75 | 75 |
| stabilised egg yolk | 4.2 | 4.2 | 4.2 | 4.2 | 4.2 | 4.2 |
| acetic acid | 0.3 | 0.3 | 0.3 | 0.3 | 0.3 | 0.3 |
| phenolic compounds mix | 0 | 0 | 5 | 5 | 5 | 5 |
| sucrose | 1.3 | 1.3 | 1.3 | 1.3 | 1.3 | 1.3 |
| salt (NaCl) | 1.3 | 1.3 | 1.3 | 1.3 | 1.3 | 1.3 |
| flavour | 0.2 | 0.2 | 0.2 | 0.2 | 0.2 | 0.2 |
| EDTA | 0.0075 | 0 | 0 | 0 | 0 | 0 |
| Caramel sample H | | 2 | | | | |
| Caramel sample J | | | 2 | | | |

TABLE 9-continued

Recipe of mayonnaises containing various caramels.

| | Mayonnaise | | | | | |
|---|---|---|---|---|---|---|
| Ingredient | 3-1 conc. [wt %] | 3-2 conc. [wt %] | 3-3 conc. [wt %] | 3-4 conc. [wt %] | 3-5 conc. [wt %] | 3-6 conc. [wt %] |
| Caramel sample K | | | | | 2 | |
| Caramel sample L | | | | | | 2 |
| Water | to 100% | to 100% | to 100% | to 100% | to 100% | to 100% |

The mayonnaises were prepared similarly as in example 2. The phenolic compounds present in the mayonnaises in Table 9 originate from the phenolic compounds mix. This means that the concentration of phenolic compounds in the mayonnaises 3-3 to 3-6 can be calculated based on the concentration in the phenolic compounds mix, which is incorporated in these samples at a concentration of 5%:

TABLE 10

Concentration of phenolic compounds in mayonnaises samples 3-3 to 3-6 from Table 9.

| Compound | Concentration in mayonnaise [mg/kg] | Concentration in mayonnaise [wt %] |
|---|---|---|
| 3,4-dihydroxy-benzoic acid | 14.4 | 0.0014 |
| syringic acid | 17.0 | 0.0017 |
| p-coumaric acid | 18.8 | 0.0019 |
| gallic acid•$H_2O$ | 11.3 | 0.0011 |
| caffeic acid | 7.1 | 0.00071 |
| trans-ferulic acid | 10.6 | 0.0011 |
| vanillic acid | 7.4 | 0.00074 |
| DL-catechin hydrate | 81.6 | 0.0082 |

They were subjected to oxidation tests as described above, and the length of the lag phase was determined. The results are shown in the following tables. Each data point is based on two duplicates or three triplicates, of which the average value is given, as well as the resulting error in the data point.

TABLE 11

Hexanal response × $10^{-6}$ (arbitrary units) in accelerated oxidation test of mayonnaises from Table 9 and absolute error in the response data points.

| | sample | | | | | |
|---|---|---|---|---|---|---|
| | 3-1 | | 3-2 | | 3-3 | |
| Time [days] | response | error | response | error | response | error |
| 0 | 0.02 | 0.00 | 0.02 | 0.00 | 0.02 | 0.00 |
| 4 | 0.02 | 0.01 | 2.14 | 0.11 | 0.20 | 0.01 |
| 5 | 0.03 | 0.01 | 3.07 | 0.47 | 0.18 | 0.14 |
| 7 | 0.03 | 0.01 | 4.98 | 0.27 | 0.44 | 0.07 |
| 10 | 0.03 | 0.00 | 19.58 | 4.86 | 1.11 | 0.19 |
| 12 | 0.04 | 0.00 | 11.82 | 1.24 | 3.70 | 0.32 |
| 14 | 0.04 | 0.00 | 11.20 | 1.87 | 6.72 | 2.36 |
| 17 | 0.07 | 0.02 | 10.47 | 2.13 | 7.08 | 0.26 |
| 19 | 0.20 | 0.04 | 38.02 | 4.77 | 5.23 | 0.90 |
| 21 | 0.61 | 0.60 | 13.31 | 1.47 | 21.78 | 8.63 |
| 24 | 0.30 | 0.01 | 28.85 | 16.40 | 5.69 | 0.58 |
| 26 | 0.88 | 0.26 | 28.61 | 14.95 | 19.35 | 15.72 |

TABLE 11-continued

Hexanal response × $10^{-6}$ (arbitrary units) in accelerated oxidation test of mayonnaises from Table 9 and absolute error in the response data points.

| | sample | | | | | |
|---|---|---|---|---|---|---|
| | 3-4 | | 3-5 | | 3-6 | |
| Time [days] | response | error | response | error | response | error |
| 0 | 0.02 | 0.00 | 0.02 | 0.00 | 0.01 | 0.00 |
| 4 | 0.17 | 0.00 | 0.15 | 0.01 | 0.21 | 0.01 |
| 5 | 0.23 | 0.02 | 0.20 | 0.02 | 0.22 | 0.02 |
| 7 | 0.33 | 0.01 | 0.23 | 0.02 | 0.30 | 0.01 |
| 10 | 0.54 | 0.03 | 0.33 | 0.02 | 0.50 | 0.17 |
| 12 | 0.97 | 0.08 | 0.43 | 0.06 | 0.56 | 0.02 |
| 14 | 3.67 | 1.85 | 0.53 | 0.14 | 0.70 | 0.10 |
| 17 | 7.08 | 2.56 | 0.55 | 0.06 | 0.94 | 0.02 |
| 19 | 4.30 | 0.52 | 0.77 | 0.09 | 1.20 | 0.02 |
| 21 | 4.59 | 0.14 | 2.37 | 1.98 | 3.44 | 0.57 |
| 24 | 4.15 | 1.30 | 1.14 | 0.32 | 6.89 | 4.33 |
| 26 | 16.86 | 16.32 | 1.53 | 0.13 | 13.90 | 4.49 |

Based on the hexanal response, the length of the lag phase can be determined, counting from the day at which the oxidation test was started. This is given in the following table.

TABLE 12

Length of lag phase, based on hexanal response from Table 11.

| Sample | Length of lag phase [days] |
|---|---|
| 3-1 (+EDTA) | >26 |
| 3-2 (no EDTA) | ~7 |
| 3-3 (car. H) | ~12 |
| 3-4 (car. J) | ~15 |
| 3-5 (car. K) | >26 |
| 3-6 (car. L) | ~21 |

These results show that the addition of caramels leads to a shift of the lag phase, compared to the sample without EDTA (3-2). The longer the heating, the longer the lag phase. Also fructose (3-6) has a long lag phase, although in this experiment less long than the similar caramel based on sucrose (3-5). The combination of the caramel which had been heated for 12 minutes with the phenolic compounds mix (3-5) leads to a length of the lag phase which is similar to the lag phase of the sample with EDTA (3-1). This means that EDTA can be replaced by caramel and phenolic compounds.

Example 4

Caramels in Mayonnaise With Various Sources of Phenolic Compounds

Caramel sample M from Table 5 in example 1 was used to prepare mayonnaises according to the recipes in Table 13. As comparison mayonnaises containing EDTA were prepared as well, without caramel.

TABLE 13

Recipe of mayonnaises containing caramel and various sources of phenolic compounds.

| | Mayonnaise | | | | |
|---|---|---|---|---|---|
| Ingredient | 4-1 conc. [wt %] | 4-2 conc. [wt %] | 4-3 conc. [wt %] | 4-4 conc. [wt %] | 4-5 conc. [wt %] |
| soybean oil | 75 | 75 | 75 | 75 | 75 |
| stabilised egg yolk | 4.2 | 4.2 | 4.2 | 4.2 | 4.2 |
| acetic acid | 0.3 | 0.3 | | | |
| White wine vinegar | | | 2.5 | | |
| Apple vinegar | | | | 5 | |
| Phenolic compounds mix | | | | | 5 |
| Sucrose | 1.3 | 1.3 | 1.3 | 1.3 | 1.3 |
| salt (NaCl) | 1.3 | 1.3 | 1.3 | 1.3 | 1.3 |
| flavour | 0.2 | 0.2 | 0.2 | 0.2 | 0.2 |
| EDTA | 0.0075 | 0 | 0 | 0 | 0 |
| Caramel sample M | | | 2 | 2 | 2 |
| Water | to 100% | to 100% | to 100% | to 100% | to 100% |

The mayonnaises were prepared similarly as in example 2. They were subjected to oxidation tests as described above, and the length of the lag phase was determined. The results are shown in the following table. Each data point is based on two duplicates or three triplicates, of which the average value is given, as well as the resulting error in the data point.

The concentration of phenolic compounds in the mayonnaises can be estimated:

- Sample 4-3: concentration of phenolic compounds in white wine vinegar is estimated to be about 80 μg/mL as gallic acid equivalents (GAE) (see P. Pinsirodom, Asian Journal of Food and Agro-Industry, 3(04), p. 389-397, 2010), leading to an estimated concentration of phenolic compounds in sample 4-3 of about 0.0002% GAE.
- Sample 4-4: concentration of phenolic compounds in apple vinegar is estimated to be about 180 μg/mL as gallic acid equivalents (GAE) (see P. Pinsirodom, Asian Journal of Food and Agro-Industry, 3(04), p. 389-397, 2010), leading to an estimated concentration of phenolic compounds in sample 4-4 of about 0.0009% GAE.
- Sample 4-5: total concentration of phenolic compounds about 0.017% (see Table 10)

TABLE 14

Hexanal response $\times 10^{-6}$ (arbitrary units) in accelerated oxidation test of mayonnaises from Table 13 and absolute error in the response data points.

| | sample | | | | | |
|---|---|---|---|---|---|---|
| | 4-1 | | 4-2 | | 4-3 | |
| Time [days] | response | error | response | error | response | error |
| 0 | 0.01 | 0.01 | 0.01 | 0.00 | 0.01 | 0.01 |
| 3 | 0.03 | 0.01 | 0.11 | 0.00 | 0.04 | 0.00 |
| 6 | 0.02 | 0.00 | 0.50 | 0.01 | 0.09 | 0.00 |
| 7 | 0.02 | 0.00 | 0.85 | 0.16 | 0.12 | 0.01 |
| 10 | 0.03 | 0.00 | 1.45 | 0.19 | 0.17 | 0.01 |
| 13 | 0.08 | 0.02 | 5.98 | 0.34 | 0.47 | 0.11 |
| 14 | 0.08 | 0.03 | 4.78 | 0.28 | 0.43 | 0.02 |
| 17 | 0.09 | 0.03 | 4.80 | 0.46 | 0.64 | 0.02 |
| 19 | 0.10 | 0.01 | 5.98 | 1.22 | 0.81 | 0.12 |
| 24 | 0.18 | 0.01 | 18.49 | 2.17 | 3.10 | 0.15 |
| 26 | 0.18 | 0.02 | 15.77 | 3.08 | 6.88 | 3.78 |
| 28 | 0.29 | 0.03 | 8.21 | 3.86 | 4.12 | 0.35 |
| 31 | 1.60 | 1.15 | 7.82 | 0.93 | 22.32 | 6.47 |
| 33 | 0.73 | 0.17 | 6.80 | 1.19 | 11.67 | 3.06 |
| 35 | 1.92 | 0.70 | 12.73 | 8.95 | 35.96 | 28.92 |
| 38 | 10.62 | 1.80 | | | | |
| 40 | 11.98 | 0.47 | | | | |
| 42 | 26.85 | 14.41 | | | | |

| | sample | | | |
|---|---|---|---|---|
| | 4-4 | | 4-5 | |
| Time [days] | response | error | response | error |
| 0 | 0.01 | 0.00 | 0.01 | 0.00 |
| 3 | 0.06 | 0.02 | 0.06 | 0.01 |
| 6 | 0.09 | 0.01 | 0.10 | 0.01 |
| 7 | 0.11 | 0.01 | 0.12 | 0.02 |
| 10 | 0.19 | 0.03 | 0.16 | 0.01 |
| 13 | 0.51 | 0.05 | 0.41 | 0.02 |
| 14 | 0.42 | 0.04 | 0.37 | 0.02 |
| 17 | 0.60 | 0.04 | 0.56 | 0.16 |
| 19 | 0.85 | 0.17 | 0.54 | 0.05 |
| 24 | 5.44 | 0.58 | 1.16 | 0.35 |
| 26 | 5.83 | 2.57 | 1.11 | 0.22 |
| 28 | 5.90 | 2.36 | 1.25 | 0.20 |
| 31 | 5.63 | 1.03 | 2.04 | 0.28 |
| 33 | 23.78 | 5.63 | 2.04 | 0.15 |
| 35 | 7.15 | 3.23 | 2.40 | 0.52 |
| 38 | | | 14.51 | 1.87 |
| 40 | | | 8.94 | 6.86 |
| 42 | | | 23.86 | 16.84 |

Based on the hexanal response, the length of the lag phase can be determined counting from the day at which the oxidation test was started. This is given in the following table.

TABLE 15

Length of lag phase, based on hexanal response from Table 14.

| Sample | Length of lag phase [days] |
|---|---|
| 4-1 (+EDTA) | ~35 |
| 4-2 (no EDTA) | ~10 |
| 4-3 (white wine vinegar) | ~24 |
| 4-4 (apple vinegar) | ~26 |
| 4-5 (phenolic compounds mix) | ~35 |

These results show that using caramel M (see Table 5) which has been heated at a temperature at 180° C., and having a light colour (similar to caramel F from Table 2 and Table 4), in combination with the phenolic compounds mixture leads to a lag phase, similar to using EDTA. Therefore sample 4-5 with the highest concentration of phenolic compounds showed the best oxidation results, compared to the samples with a lower concentration of phenolic compounds, samples 4-3 and 4-4. Nevertheless, also these samples show that the combination of caramel and phenolic compounds present in vinegars, leads to a strong antioxidant effect, and reduction of the oxidation of vegetable oil in the mayonnaises. Therefore using a light coloured caramel, in combination with a vinegar containing phenolic compounds leads to decreased reduction of triglycerides in a mayonnaise, and is suitable to be used in a mayonnaise without strongly darkening the colour of the mayonnaise.

Example 5

Commercial Caramels in Mayonnaise

A commercial caramel (NCS 23P ex Buisman, Zwartsluis, Netherlands) was used to compare the antioxidant effect of caramel with or without phenolic compounds mix. This caramel is dark coloured, nevertheless it was used for proof of principle. Mayonnaises were prepared according to the recipes in Table 16. As comparison mayonnaises containing EDTA were prepared as well, without caramel.

TABLE 16

Recipe of mayonnaises containing caramel and phenolic compounds.

| | Mayonnaise | | | |
| --- | --- | --- | --- | --- |
| Ingredient | 5-1 conc. [wt %] | 5-2 conc. [wt %] | 5-3 conc. [wt %] | 5-4 conc. [wt %] |
| soybean oil | 75 | 75 | 75 | 75 |
| stabilised egg yolk | 4.2 | 4.2 | 4.2 | 4.2 |
| acetic acid | 0.3 | 0.3 | 0.3 | 0.3 |
| caramel Buisman | | | 2 | 2 |
| phenolic compounds mix | | | | 5 |
| sucrose | 1.3 | 1.3 | 1.3 | 1.3 |
| salt (NaCl) | 1.3 | 1.3 | 1.3 | 1.3 |
| flavour | 0.2 | 0.2 | 0.2 | 0.2 |
| EDTA | 0.0075 | 0 | 0 | 0 |
| Water | to 100% | to 100% | to 100% | to 100% |

The mayonnaises were prepared similarly as in example 2. The concentration of phenolic compounds in mayonnaise 5-4 was about 0.017% (see Table 10). They were subjected to oxidation tests as described above, and the length of the lag phase was determined. The results are shown in the following table. Each data point is based on two duplicates or three triplicates, of which the average value is given.

TABLE 17

Hexanal response × $10^{-6}$ (arbitrary units) in accelerated oxidation test of mayonnaises from Table 16.

| | sample | | | |
| --- | --- | --- | --- | --- |
| Time [days] | 5-1 response | 5-2 response | 5-3 response | 5-3 response |
| 0 | <1 | 0 | <1 | <1 |
| 2 | <1 | <1 | <1 | <1 |
| 5 | <1 | 2 | <1 | <1 |
| 9 | <1 | 4 | <1 | <1 |
| 12 | <1 | 19 | 1 | <1 |
| 14 | <1 | 24 | 13 | <1 |
| 16 | <1 | | 8.5 | <1 |
| 19 | <1 | 43 | 9.5 | 1 |
| 21 | <1 | 40.5 | 10 | 1 |
| 24 | <1 | | | 1 |
| 26 | <1 | 57 | 14 | 2 |
| 28 | 1.5 | 48 | 13 | 2 |
| 30 | 1 | 41.5 | 9 | 3 |

Based on the hexanal response, the length of the lag phase can be determined counting from the day at which the oxidation test was started. This is given in the following table.

TABLE 18

Length of lag phase, based on hexanal response from Table 17.

| Sample | Length of lag phase [days] |
| --- | --- |
| 5-1 (+EDTA) | >30 |
| 5-2 (no EDTA) | ~9 |
| 5-3 (car.) | ~12 |
| 5-4 (car. + phenolic compounds mix) | ~30 |

These results show that using caramel only leads to a reduction of oxidation rate, comparing to the sample without EDTA. When additionally phenolic compounds are added, the combination of caramel and these compounds leads to a length of the lag phase which is nearly as good as long as the sample with EDTA.

Example 6

Caramel in Mayonnaise

Mayonnaises according to the recipes in table 19 were prepared.

TABLE 19

Recipe of mayonnaises containing various caramels.

| | Mayonnaise | | | | | |
| --- | --- | --- | --- | --- | --- | --- |
| Ingredient | 502 conc. [wt %] | 503 conc. [wt %] | 504 conc. [wt %] | 505 conc. [wt %] | 506 conc. [wt %] | 507 conc. [wt %] |
| soybean oil | 77.8 | 77.8 | 77.8 | 77.8 | 77.8 | 77.8 |
| stabilised egg yolk | 4.2 | 4.2 | 4.2 | 4.2 | 4.2 | 4.2 |
| spirit vinegar | 2.4 | 2.4 | | 2.4 | | |
| apple vinegar | | | 5.8 | | 5.8 | 5.8 |
| sucrose | 1.3 | 1.3 | 1.3 | 1.3 | 1.3 | 1.3 |
| salt (NaCl) | 1.2 | 1.2 | 1.2 | 1.2 | 1.2 | 1.2 |
| lemon juice | 0.05 | 0.05 | 0.05 | 0.05 | 0.05 | 0.05 |
| EDTA | 0.0075 | | | | | |
| Caramel | | | | 2.0 | 2.0 | 2.0 |
| Water | to 100% | to 100% | to 100% | to 100% | to 100% | to 100% |

The caramel used in these emulsions was prepared by heating sucrose at pH 7, at a temperature of 220° C. during about 12 minutes.

The mayonnaises were prepared by first preparing an aqueous phase, which was prepared by mixing water, egg yolk, sucrose, salt, and EDTA, as applicable. Subsequently oil was slowly added to the aqueous phase, while mixing with a high shear mixer (Silverson). The oil was added in about 10 minutes, while the mixing speed was slowly increased from about 1600 to about 7200 rpm. After the oil had been homogenised, and the emulsion had become smooth, vinegar and lemon juice were slowly added while the mixer was kept at 7200 rpm. The final pH of the mayonnaises after acidification was adjusted to 3.9 before subjecting these to oxidation measurements (using 1M sodium hydroxide of 1M hydrogen chloride).

Emulsions 505 and 506 were prepared by adding the caramel to the aqueous phase, prior to the addition of the oil to this aqueous phase. The caramel was dissolved in water before addition to the aqueous phase. The concentration of caramel in table 19 is based on the dry caramel.

Emulsion 507 was prepared by dissolving caramel in the vinegar first. This mixture was kept at room temperature during 1.5 hours. This mixture was added to the oil-in-water emulsion to acidify the emulsion. The aqueous phase (prior to the addition of the oil) did not contain caramel.

These mayonnaises were subjected to oxidation tests as described above, and the length of the lag phase was determined. The results are shown in the following tables. Each data point is based on two duplicates or three triplicates, of which the average value is given, as well as the resulting error in the data point.

TABLE 20

Hexanal response (arbitrary units) in accelerated oxidation test of mayonnaises from table 19 and standard deviation in the response data points.

| | sample | | | | | |
|---|---|---|---|---|---|---|
| | 502 | | 503 | | 504 | |
| Time [days] | peak area | st. dev. | peak area | st. dev. | peak area | st. dev. |
| 0 | 859 | 755 | 304 | 64 | 556 | 374 |
| 1 | 769 | 372 | 383 | 143 | 266 | 68 |
| 4 | 271 | 75 | 1180 | 62 | 1179 | 63 |
| 6 | 423 | 159 | 2597 | 194 | 2039 | 33 |
| 8 | 472 | 233 | 5288 | 407 | 3282 | 288 |
| 11 | 445 | 61 | 9906 | 1887 | 3545 | 2849 |
| 13 | 608 | 69 | 21180 | 2099 | 7233 | 286 |
| 15 | 4564 | 6030 | 41370 | 9348 | 15668 | 6126 |
| 18 | 1823 | 340 | 59041 | 6661 | 39157 | 7839 |
| 20 | 2260 | 218 | | | | |
| 22 | 3152 | 880 | | | | |
| 25 | 6942 | 3831 | 95559 | 48493 | 75286 | 39739 |
| 29 | 12017 | 4710 | 61916 | 9426 | 50692 | 5865 |
| 32 | 62129 | 21324 | 89596 | 35573 | 60630 | 7083 |
| 34 | 102199 | 52947 | | | | |

| | sample | | | | | |
|---|---|---|---|---|---|---|
| | 505 | | 506 | | 507 | |
| Time [days] | peak area | st. dev. | peak area | st. dev. | peak area | st. dev. |
| 0 | 304 | 149 | 450 | 236 | 351 | 110 |
| 1 | 372 | 233 | 486 | 172 | 484 | 210 |
| 4 | 1042 | 374 | 1265 | 149 | 1461 | 255 |
| 6 | 1887 | 144 | 1681 | 170 | 2303 | 103 |
| 8 | 3009 | 194 | 2462 | 187 | 3397 | 231 |
| 11 | 4308 | 252 | 4353 | 369 | 4811 | 398 |
| 13 | 5743 | 740 | 5833 | 661 | 9634 | 6022 |
| 15 | 9888 | 3080 | 11207 | 872 | 7899 | 380 |
| 18 | 19816 | 14811 | 10247 | 1489 | 13190 | 2157 |
| 20 | | | | | | |
| 22 | 30074 | 15090 | 14998 | 3158 | 14369 | 336 |
| 25 | 92691 | 17583 | 26617 | 17297 | 19495 | 3420 |
| 29 | 75325 | 28390 | 53488 | 12092 | 83800 | 40992 |
| 32 | 116066 | 47093 | 77192 | 28726 | 120295 | 51831 |
| 34 | | | | | | |

Based on the hexanal response, the length of the lag phase can be determined, counting from the day at which the oxidation test was started. This is given in the following table.

TABLE 21

Length of lag phase, based on hexanal response from Table 11.

| Sample | Length of lag phase [days] |
|---|---|
| 502 (+EDTA) | 29 |
| 503 (no EDTA) | 11 |
| 504 (apple vinegar) | 15 |
| 505 (caramel) | 18 |
| 506 (apple vinegar & caramel) | 22 |
| 507 (apple vinegar & caramel added together) | 22 |

These results confirm that the addition of caramels in combination with apple vinegar leads to a shift of the lag phase, compared to the sample without EDTA, or with caramel alone, or with apple vinegar alone. In this experiment the separate addition of apple vinegar and caramel, or the addition of apple vinegar in combination with caramel led to the same length of the lag phase.

The invention claimed is:

1. A composition in the form of an oil-in-water emulsion having a pH ranging from 3 to 5, comprising
vegetable oil comprising mono-unsaturated and/or poly-unsaturated fatty acids, wherein the concentration of the vegetable oil ranges from 5% to 85% by weight of the composition, further comprising
caramel and one or more phenolic compounds, wherein the caramel is obtained by heating a mixture consisting essentially of one or more monosaccharides and/or one or more disaccharides and water, the mixture heated to a temperature ranging from 110° C. to 230° C. during a time period ranging from 30 seconds to 30 minutes, in the absence of phenolic compounds; and
wherein the composition comprises vinegar selected from apple vinegar, white wine vinegar, red wine vinegar, malt vinegar, and grape must, and any combination of these; and
wherein the one or more phenolic compounds comprise one or more compounds from the group consisting of 3,4-dihydroxy-benzoic acid, syringic acid, p-coumaric acid, gallic acid, caffeic acid, trans-ferulic acid, vanillic acid, and DL-catechin hydrate; and wherein the concentration of the caramel ranges from 0.5% to 3% by weight of the composition: and wherein a 10% by weight solution of the caramel in water has a colour value L* ranging from 30 to 65, and an a* value ranging from 5 to 30, and a b* value ranging from 10 to 70, and a ΔE* value as compared to water ranging from 0 to 70.

2. The composition according to claim 1, wherein the composition comprises an oil-in-water emulsifier.

3. The composition according to claim 2, wherein the oil-in-water emulsifier comprises egg yolk.

4. The composition according to claim 1, wherein the mixture comprising one or more monosaccharides and/or one or more disaccharides and water is heated to a temperature ranging from 180° C. to 230° C. during a time period ranging from 30 seconds to 5 minutes to obtain the caramel.

5. The composition according to claim 4, wherein the mixture is heated to a temperature ranging from 180° C. to 230° C. during a time period ranging from 40 seconds to 3 minutes to obtain the caramel.

6. The composition according to claim 1, wherein the concentration of the caramel ranges from 1% to 3% by weight of the composition.

7. The composition according to claim 1, wherein a 10% by weight solution of the caramel in water has a ΔE* value as compared to water ranging from 0 to 60.

8. The composition according to claim 1, wherein the total concentration of the one or more phenolic compounds ranges from 0.0001% to 0.1% by weight of the composition.

9. The composition according to claim 1, wherein the total concentration of the one or more phenolic compounds ranges from 0.0001% to 0.1% by weight of the composition.

\* \* \* \* \*